Aug. 12, 1930.  L. L. BORRESON  1,773,074
ELECTRIC GENERATOR
Filed March 27, 1928  2 Sheets-Sheet 1

Leonard L. Borreson
INVENTOR
BY Victor J. Evans
ATTORNEY

WITNESS:

Aug. 12, 1930.  L. L. BORRESON  1,773,074
ELECTRIC GENERATOR
Filed March 27, 1928   2 Sheets-Sheet 2

Leonard L. Borreson
INVENTOR

BY Victor J. Evans
ATTORNEY

WITNESS:

Patented Aug. 12, 1930							1,773,074

UNITED STATES PATENT OFFICE

LEONARD L. BORRESON, OF KERMIT, NORTH DAKOTA

ELECTRIC GENERATOR

Application filed March 27, 1928. Serial No. 265,059.

This invention relates to dynamo electric machines for generating electric current.

The invention more particularly relates to a type of electric generator of the inductor type, the object being to generate an electric current by means of a rotative inductor cooperating with a stator having a plurality of salient poles alternately north and south supplied by an exciting current in inductive relation to which is mounted a series of inductively related coils from which an induced current may be derived without the assistance of brushes or a commutator.

In carrying out the invention I provide an annular stator having a circumferential series of alternately north and south poles preferably excited by a local supply current in inductive relation to which I mount a conforming series of secondary coils inductively related either by superposition on the same poles or by mounting on adjacent poles from which the generated current may be distributed. The rotor adapted for rotation in the polar field carries a plurality of laminated sectors spanning consecutive north and south poles and mounted on a spider carried by the rotor shaft of non-magnetic material. With such a construction it will be apparent that upon rotative motion of the rotor the field of force developed by the stator will be constantly cut by a series of magnetic loops of lines of force to the rotor from poles alternately north and south, thereby generating an induced current in the secondary coils which may be directly transferred for power generation in motors, which may be similarly constituted to the generator or of any other type.

Referring now in particular to the drawings:—

Figure 1:
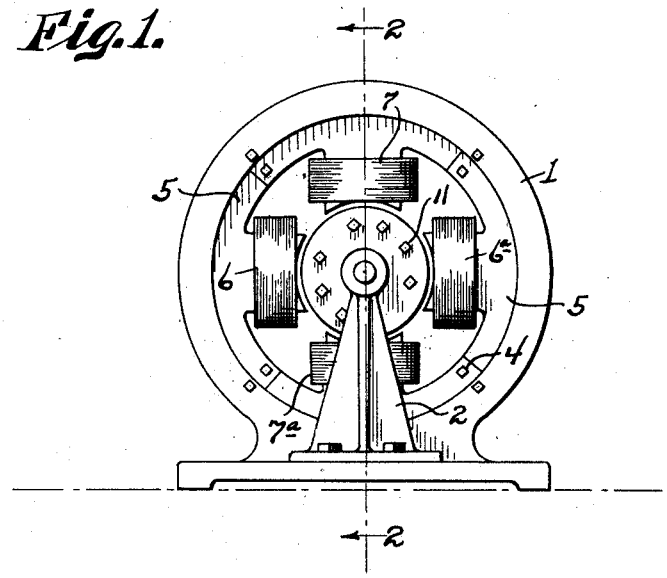
Figure 1 illustrates a four pole type of a generator embodying my improvement.
Figure 2:
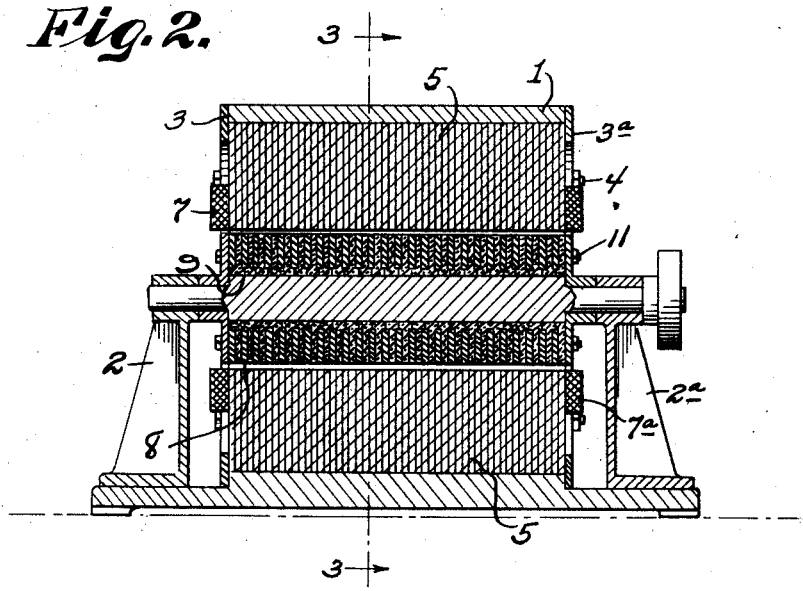
Fig. 2 is a sectional view thereof.

Referring now in particular to the drawings, 1 represents a stator which may be of cast iron provided with a pair of standards 2, 2ª to support a rotor. The stator is composed of a pair of end plates 3, 3ª of cast iron holding in place a plurality of laminæ by a series of transverse bolts 4 clamping a plurality of laminated plates 5 of soft iron. The stator is provided with a plurality of interior projecting integral laminated pole pieces of highly magnetic material as soft iron of any desired number according to the frequency desired, on which are mounted a plurality of primary excitation coils 6, 6ª to develop north and south poles by means of the direct current supplied locally to the coils by any desired type of exciter. Adjacent to these coils may be placed inductively related secondary coils 7, 7ª the terminals of which supply a circuit without commutator or slip rings. Rotated within the stator is a rotor on the shaft of which may be mounted a series of laminated iron plates 8 magnetically insulated from the shaft. This insulation is in the form of a brass or similar non-magnetic sleeve, having diametrically disposed ribs 8ª extending therefrom and arcuate-shaped magnetizable plates spaced longitudinally of and disposed transversely with respect to the sleeve.

Figure 5:
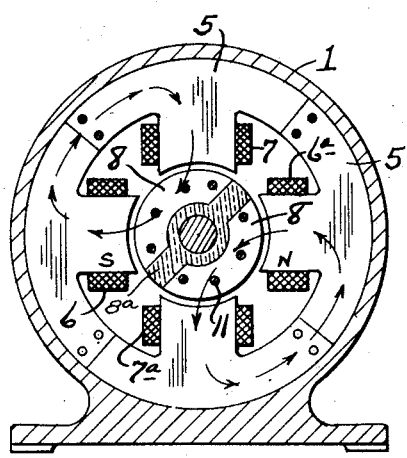
Fig. 5 shows a magnetic circuit on completion of a complete cycle.
Figure 6:
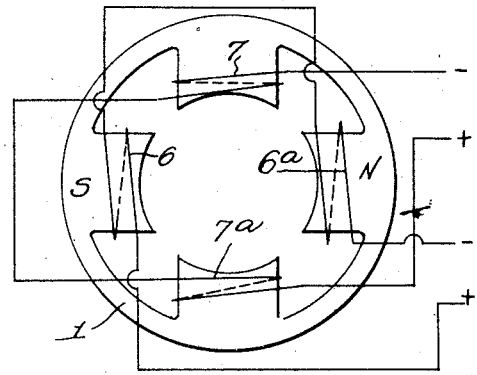
Fig. 6 is a diagram of the primary and secondary coils as arranged on adjacent poles.

In the form shown in the drawings the iron laminæ are arc-shaped, covering an angle determined by the frequency, and in the present case which illustrates the multi-polar machine are something less than semi-circular, as clearly indicated in Fig. 5. These arc-shaped pieces are positioned within recesses 9 formed by the sleeve and ribs and plates and are clamped in position between a pair of end plates of brass by a plurality of lengthwise bolts 11. The exciting and derived circuits are indicated in the diagram Fig. 6. The primary coils exciting a bi-polar field and the secondary coils being wound on pole pieces of an adjacent bi-polar field; it is not absolutely necessary that the primary and secondary coils should be wound upon adjacent fields as they might with equal advantage be applied as superposed windings on the primary poles. It is equally evident that my invention is not limited to a bi-polar field, as any desired number of adjacent north and south poles may be applied on the stator according to the frequency desired.

Figure 3:
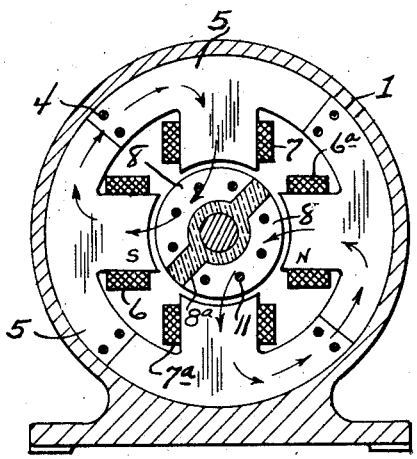
Fig. 3 is a sectional view showing the magnetic circuit of the primary coil.
Figure 4:
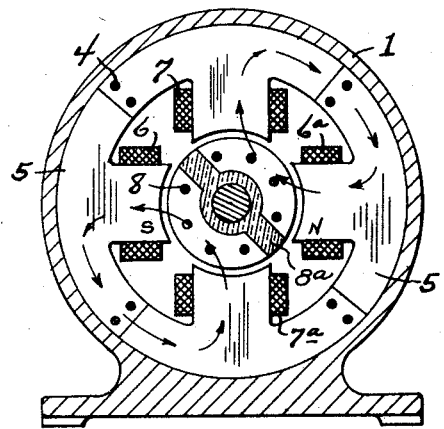
Fig. 4 is a similar view showing the circuit in another phase.

As indicated in Fig. 3 the flux lines are shown as reaching the adjacent primary and secondary poles. Fig. 4 shows a phase of action a half-phase removed from that of Fig. 3, and Fig. 5 shows a completed cycle.

Having thus described my invention, what I claim as new and desire to secure by Letters-Patent is:—

A flux distributing inductor type armature for dynamo-electric machines comprising a non-magnetic sleeve surrounding the shaft, radially disposed non-magnetic ribs extending longitudinally of the sleeve and non-magnetic arcuate-shaped plates disposed transversely of and spaced longitudinally of the ribs and sleeve and defining spaced recesses, and arcuate-shaped inductor plates secured within the recesses.

In testimony whereof I affix my signature.

LEONARD L. BORRESON.